US007817673B2

(12) United States Patent
Scott et al.

(10) Patent No.: US 7,817,673 B2
(45) Date of Patent: Oct. 19, 2010

(54) CLOCK SYNCHRONISATION OVER A PACKET NETWORK

(75) Inventors: Martin Raymond Scott, Cornwall (GB); Timothy Michael Edmund Frost, Plymouth (GB); Geoffrey Edward Floyd, Devon (GB); Martin Crowle, Devon (GB)

(73) Assignee: Zarlink Semiconductor Limited, Swindon (GB)

( * ) Notice: Subject to any disclaimer, the term of this patent is extended or adjusted under 35 U.S.C. 154(b) by 202 days.

(21) Appl. No.: 12/056,735

(22) Filed: Mar. 27, 2008

(65) Prior Publication Data

US 2008/0212619 A1   Sep. 4, 2008

Related U.S. Application Data

(63) Continuation of application No. 10/792,389, filed on Mar. 4, 2004, now abandoned.

(30) Foreign Application Priority Data

Mar. 7, 2003    (GB)    ................. 0305245.3

(51) Int. Cl.
H04J 3/06    (2006.01)
(52) U.S. Cl. .................................. 370/503
(58) Field of Classification Search ............. 370/347, 370/325, 395.62, 356, 474, 537, 503–520; 375/327, 354–376
See application file for complete search history.

(56) References Cited

U.S. PATENT DOCUMENTS

| 4,541,031 | A | 9/1985 | Ibbetson |
| 4,569,042 | A | 2/1986 | Larson |
| 5,450,394 | A | 9/1995 | Gruber et al. |
| 5,526,362 | A | 6/1996 | Thompson et al. |
| 5,666,358 | A | 9/1997 | Paratore et al. |
| 5,802,082 | A | 9/1998 | Roppel |
| 5,844,891 | A | 12/1998 | Cox |
| 5,995,570 | A | 11/1999 | Onvural et al. |
| 6,111,878 | A | * 8/2000 | Powell ................. 370/395.62 |
| 6,252,850 | B1 | 6/2001 | Lauret |
| 6,279,058 | B1 | 8/2001 | Gulick |
| 6,661,810 | B1 | 12/2003 | Skelly et al. |
| 6,687,223 | B1 | 2/2004 | Sajadieh et al. |

(Continued)

FOREIGN PATENT DOCUMENTS

EP    1 006 686 A1    6/2000

(Continued)

OTHER PUBLICATIONS

D. L. Mills, "Internet Time Synchronization: the Network Time Protocol," Network Working Group, Request for Comments: 1129, University of Delaware, Oct. 1989, pp. i-ii and 1-27.

(Continued)

*Primary Examiner*—Kwang B Yao
*Assistant Examiner*—Kenan Cehic
(74) *Attorney, Agent, or Firm*—Arent Fox LLP (57) ABSTRACT

A method of synchronising first and second clocks coupled respectively to ingress and egress interfaces 6,7 of a packet network 1, the method comprising calculating a minimum packet Transit Time over the network 1 in each of successive time intervals, and varying the frequency of the second clock so as to track variations in the minimum packet Transit Time.

26 Claims, 6 Drawing Sheets

U.S. PATENT DOCUMENTS

| | | |
|---|---|---|
| 6,721,328 B1 | 4/2004 | Nichols et al. |
| 6,785,230 B1 | 8/2004 | Ogata et al. |
| 6,807,180 B1 | 10/2004 | Restivo |
| 6,819,685 B1 | 11/2004 | Abouchakra et al. |
| 6,898,213 B1 | 5/2005 | Shimelmitz et al. |
| 2002/0131370 A1 | 9/2002 | Chuah et al. |
| 2002/0136232 A1 | 9/2002 | Dudziak et al. |
| 2005/0111361 A1 | 5/2005 | Hosein |

FOREIGN PATENT DOCUMENTS

| | | |
|---|---|---|
| JP | 10-271115 | 10/1998 |
| JP | 2000-174821 | 6/2000 |
| JP | 2001-045067 | 2/2001 |
| WO | WO 00/16509 A1 | 3/2000 |
| WO | WO 01/18998 A1 | 3/2001 |

OTHER PUBLICATIONS

D. L. Mills, "Measured Performance of the Network Time Protocol in the Internet System," Network Working Group, Request for Comments: 1128, University of Delaware, Oct. 1989, pp. i-ii and 1-18.

\* cited by examiner

CLOCK SYNCHRONISATION OVER A PACKET NETWORK

CROSS-REFERENCE TO RELATED APPLICATIONS

This is a Continuation Application which claims the benefit of U.S. patent application Ser. No. 10/792,389, filed Mar. 4, 2004 now abandoned, and claims the priority of Patent Application No. 0305245.3, filed Mar. 7, 2003, in the United Kingdom. The disclosures of the prior applications are hereby incorporated herein in their entirety by reference.

FIELD OF THE INVENTION

The present invention relates to clock synchronisation over a packet network. The invention is applicable in particular, though not necessarily, to the synchronisation of clocks associated with time division multiplexed transmission links interconnected by a packet network.

Communication networks typically make use of one of two well established transmission mechanisms; circuit switched transfer and packet switched (or just packet) transfer. Older systems tend to use the former, and in the main use time division multiplexing to divide the time domain, for a given frequency band, into time slots of equal duration. Circuits are defined by grouping together identical slot positions in successive time frames. Packet networks typically do not allocate fixed resources to transmitters, but rather route packets of data on a best efforts basis, using destination address information contained in packet headers, and network switches and routers. Packet networks are becoming more popular amongst network operators as they often provide better performance, and are more cost effective to install and maintain, than equivalent circuit switched networks.

Traditionally, telecommunication networks have made use of time division multiplexed (TDM) circuits to interconnect network switches (or exchanges). However, for the above mentioned reasons of performance and cost, many operators and leased line providers (who provide bandwidth to service providers) are moving towards replacing TDM circuits with packet networks. In many cases, switch to switch "sessions" will be provided entirely over packet networks. However, it is likely that for many years to come, some operators will continue to rely upon TDM circuits to provide all or at least a part of the networks. This will necessitate interworking between packet networks and TDM "legacy" equipment.

Figure 1:
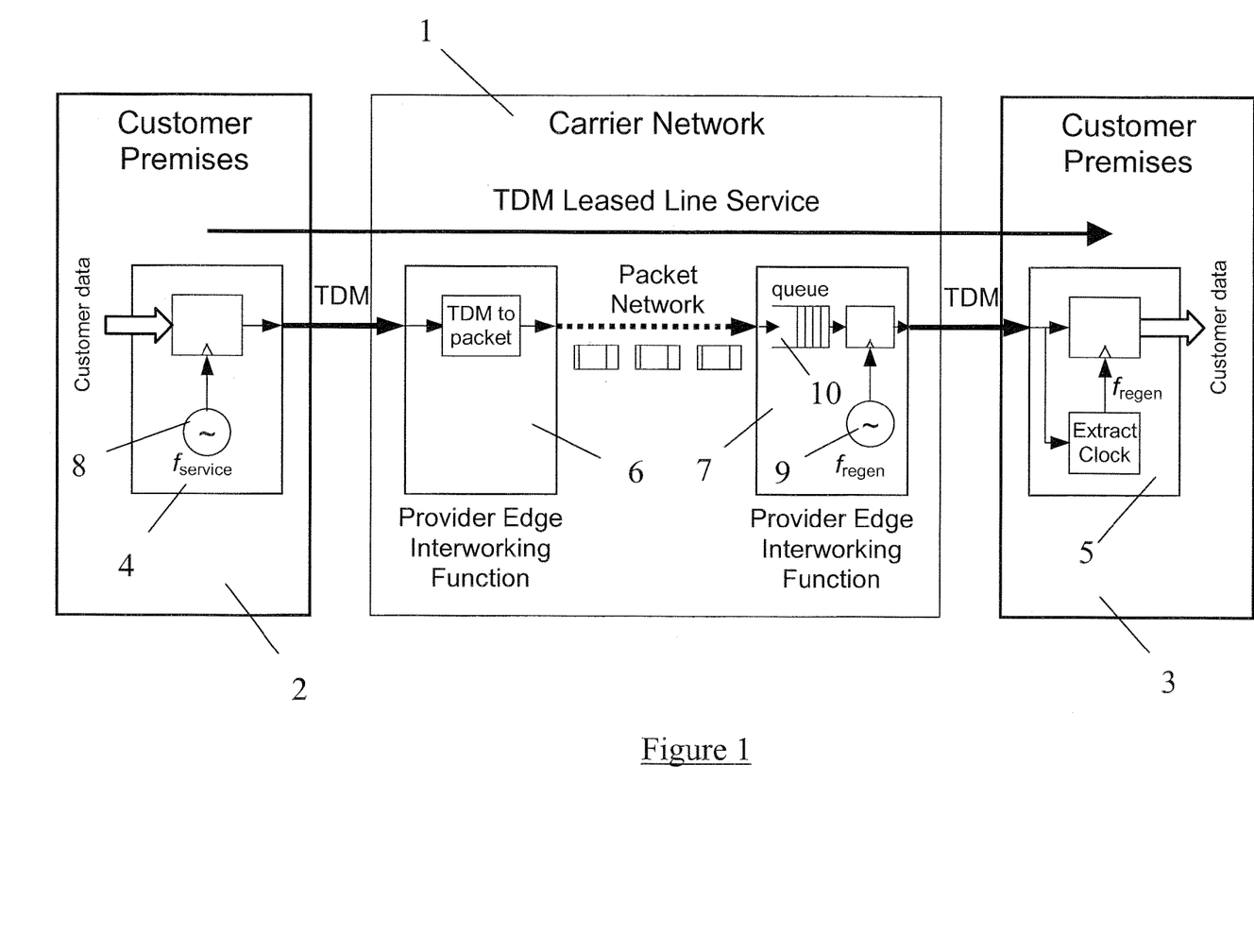
FIG. 1 illustrates schematically the interconnection of two TDM links via a packet network.

FIG. 1 illustrates schematically a carrier network 1 which is a packet switched network such as an Ethernet, ATM, or IP network. The carrier network provides leased line services to interconnect first and second customer premises 2,3, both of which make use of TDM transmitters 4,5 to handle multiple information streams. The nature of these streams is unimportant, although they could for example be voice calls, video-conference calls, or data calls. In order to facilitate the interconnection of the TDM streams, the carrier network 1 must emulate appropriate TDM circuits.

TDM links are synchronous circuits with a constant (transmission) bit rate governed by a service clock operating at some predefined frequency. In contrast, in a packet network there is no direct link between the frequency at which packets are sent from an ingress port and the frequency at which they arrive at an egress port. With reference again to FIG. 1, in order to provide TDM circuit emulation, interface nodes 6,7 at the edges of the packet network must provide interworking between the TDM links and the packet network in such a way that the TDM link at the egress side is synchronised with the TDM link at the ingress side. That is to say that the TDM service frequency ($f_{service}$) at the customer premises on the ingress side must be exactly reproduced at the egress of the packet network ($f_{regen}$). The consequence of any long-term mismatch in these frequencies will be that the queue at the egress of the packet network will either fill up or empty, depending upon on whether the regenerated clock ($f_{regen}$) is slower or faster than the original clock ($f_{service}$), causing loss of data and degradation of the service. Also, unless the phase of the original clock ($f_{service}$) is tracked by that of the regenerated clock ($f_{regen}$), the lag in frequency tracking will result in small but nonetheless undesirable changes to the operating level of the queue at the egress.

Some reliable method for synchronising both the frequency and phase of the clock at the egress of a packet network to those of the clock at the TDM transmitted must be provided One approach is to use some algorithm to recover the transmitting clock frequency and phase from timestamps incorporated into packets by the sender, taking into account the transmission delay over the packet network. As the transmission time over the packet network is unpredictable for any given packet, an adaptive algorithm might be used. For example, some form of averaging might be employed to take into account variations in the transmission delay. For ATM, ITU standard I.363.1 and ATM Forum standard af-vtoa-0078 explain the concept of an adaptive clock recovery mechanism in general terms.

SUMMARY OF THE INVENTION

It is an object of the present invention to provide an improved clock recovery mechanism which better synchronises the service clock of a TDM transmitter to the service clock at the egress of a packet network providing TDM emulation.

According to a first aspect of the present invention there is provided a method of synchronising first and second clocks coupled respectively to ingress and egress interfaces of a packet network, where the first clock determines the bit rate of a constant bit rate stream arriving at the ingress interface and the second clock rate determines the bit rate of a constant bit rate stream sent from the egress interface, the method comprising calculating a minimum packet Transit Time over the network in each of successive time intervals, and varying the frequency of the second clock so as to maintain a constant value of the calculated minimum packet transit time and hence achieve both phase and frequency synchronisation of the first and second clocks.

Preferably, said minimum packet Transit Time is calculated using Local and Remote Timestamps which increase linearly at the first and second clock frequencies respectively or at multiples or sub-multiples thereof. More preferably, the method comprises calculating a packet Transit Time for each packet received at said egress, and identifying the minimum packet Transit Time within each time interval.

In a particular embodiment of the invention, the method comprises:
  receiving a synchronous data stream at said ingress to the packet network at a frequency determined by said first clock, packetising the data, and sending the packets over the packet network;
  receiving packets at said egress from the packet network;
  for each received packet, determining a Remote Timestamp being indicative of the state of said first clock when the packet was sent, determining a Local Timestamp for the packet, and calculating the difference between said Remote and Local Timestamps to provide a Transit Time for the packet;

determining the minimum Transit Time for packets in successive time intervals; and adjusting the frequency of said second clock so as to maintain a constant value of minimum packet transit time.

Preferably, the method comprises incorporating respective Remote Timestamps into packets at said ingress to the packet network, said step of determining a Remote Timestamp value for a packet at the egress comprising extracting the Remote Timestamp from the packet.

Alternatively, said step of determining a Remote Timestamp for each packet comprises computing the Timestamp at the egress from the packet network. Preferably, this step comprises maintaining a data counter at said egress, which counter records the data volume contained in the payloads of received packets, and using the value contained in said counter when a packet is received, as the Remote Timestamp for that packet. Alternatively, this step may comprise computing the Remote Timestamp using the packet payload size and packet sequence number.

Said Local and Remote Timestamps may be counts representing numbers of bits fractional bits, multiples of bits, frames of the synchronous data streams, or may represent packet payload size.

The frequency of the second clock may be adjusted using the difference between the most recently determined minimum Transit Time and the previously determined minimum Transit Time. Said difference is scaled by an appropriate factor and the result is added to or subtracted from the current second clock frequency.

The frequency of the second clock may be adjusted in dependence upon the difference between the most recently determined minimum Transit Time and an offset value. Said difference is scaled by an appropriate factor and the result is added to or subtracted from the current second clock frequency, and said offset value is determined using a fill level of a buffer of the egress into which incoming packets are placed. The fill level is filtered to remove short term fluctuations, and the offset value is derived from the filtered result.

In one embodiment of the present invention, the ingress to the packet network is coupled to a first time division multiplexed (TDM) link, the TDM link operating at said first clock frequency, with the egress from the packet network being coupled to a second TDM link operating at said second clock frequency.

According to a second aspect of the present invention there is provided apparatus for synchronising first and second clocks coupled respectively to ingress and egress interfaces over a packet network, the apparatus comprising means for calculating a minimum packet Transit Time in each of successive time intervals, and means for varying the frequency of the second clock so as to track variations in the minimum packet Transit Time.

In a preferred embodiment of the invention, the apparatus comprises:

first processing means for determining for each packet received at an egress of the packet network a Remote Timestamp being indicative of the state of said first clock when the packet was sent;

second processing means for determining a Local Timestamp for the packet;

difference means for calculating the difference between said Remote and Local Timestamps to provide a Transit Time for the packet;

third processing means for determining the minimum Transit Time experienced by packets in successive time intervals; and clock adjustment means for adjusting the frequency of said second clock so as to maintain a constant value of the calculated minimum packet transit time and hence achieve both phase and frequency synchronisation of the first and second clocks.

DETAILED DESCRIPTION OF CERTAIN EMBODIMENTS

Considering again the scenario illustrated in FIG. 1, where TDM transmitters 4,5 located at respective customer premises 2,3 are coupled via TDM links to interface nodes 6,7 of a carrier network 1, the rate of transmission of packets from the source or "ingress" interface 6 is isochronous and determined by a service frequency ($f_{service}$) provided for example by a suitable Oscillator 8. However, the rate of packet arrival at the destination interface 7 is perturbed by the intervening packet network. Packets will typically arrive in bursts separated by varying amounts of delay. The delay between successive packets and bursts will vary for example depending on the amount of traffic in the network. The characteristics of the network are non-deterministic, but over the long term the rate of arrival at the destination will equal the rate of departure from the source.

At the source interface 6, a timestamp is placed into the header of each packet prior to transmission. This timestamp is referred to here as the "Remote Timestamp", and is a running total of the bits received on the incoming TDM link since initialisation (wrap around of this count will occur to avoid counter overflow).

The TDM output at the destination interface 7 is isochronous and determined by a second service frequency, referred to here as the "regeneration" frequency ($f_{regen}$). This is provided by a Digitally Controlled Oscillator (DCO) 9. The destination interface output is supplied from a Packet Delay Variation (PDV) buffer 10. If the buffer 10 has zero packets in it when the TDM output requires to transmit, an underrun will occur, which is undesirable. In order to minimise underrun events it is necessary to build up the PDV buffer 10 so that it contains sufficient packets to supply the TDM output for the majority of inter packet delays. However, the PDV buffer 10 cannot be made arbitrarily large because this directly increases the end to end latency which, in general, is required to be as low as possible, the maximum tolerable latency being dependent on the application. For example, voice requires lower latency than data.

When a packet arrives at the packet input of the destination interface 7, the packet is placed into a queue of the PDV buffer 10. The Remote Timestamp is extracted from the packet and is passed to a differencer. The destination interface 7 maintains a TDM output counter which is a running total of the bits sent on the outgoing TDM link—this counter is initialised to the first received Remote Timestamp. A Local Timestamp is obtained for the received packet using this counter, and this is also provided to the differencer. The differencer subtracts the Remote Timestamp from the Local Timestamp to obtain a Transit Time.

$$\text{Transit Time}(n) = \text{Remote Timestamp}(n) - \text{Local Timestamp}(n) \quad \text{Equation (1)}$$

where n is a packet sequence number. It should be noted that because the source and destination clock frequencies and initial counts (i.e. origins) are not precisely synchronised with respect to each other, the Transit Time in this equation does not represent the actual time that the packet has taken to travel between the source and destination interfaces 6, 7. However, it is true that, given an ideal fixed delay packet network, the Transit Time will decrease if $f_{service}$ exceeds $f_{regen}$, will increase if $f_{regen}$ exceeds $f_{service}$, and will remain constant if these frequencies are identical. Therefore, variations in Transit Time values will be caused by relative offset and/or drift between the source and destination clock frequencies, and also by variation in the delay experienced by each packet as it passes through the packet network.

In a packet network, most of the transmission delay is caused by waiting time in queues at output ports of switches and routers. However, a proportion of packets will not be held up in any queues, i.e. they will just happen to arrive at each switch at a time when there are no other packets queued up. These packets will experience only a minimum delay, the value of which is largely independent of network loading, being due to factors such as cumulative line propagation delays and service delays at each switch.

If the network loading varies, the average packet transmission delay over the packet network will also vary. However, the minimum delay should not vary to the same extent. Therefore identifying the minimum packet delay within each of successive time periods should give the required indication of drift between the source and destination clock frequencies, independent of changes in network loading. This is very important where such changes in loading occur at a relatively low frequency, for example a 24 hour cycle. Such low frequency variations may be indistinguishable from source clock frequency drift which must be followed by the clock recovery system.

Figure 2:
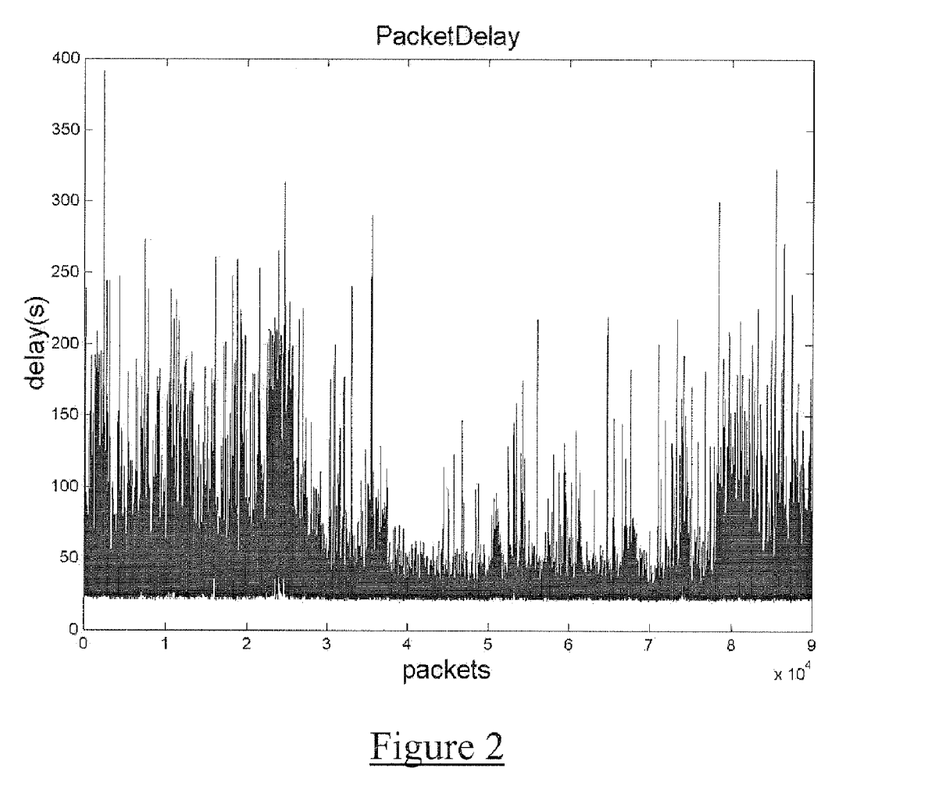
FIG. 2 shows the estimated delays suffered by a series of packets over a packet network.

FIG. 2 shows the delays suffered by packets in a packet network measured over a 12-hour period. In this test scenario, one measurement was made per second using the Unix "ping" command. It can be seen that the variation in the minimum delay is small (marked by the relatively straight bottom edge of the trace) in comparison to the variation in the instantaneous delay value. Also, the high density of the bottom edge shows that the minimum values occur fairly frequently.

In a typical implementation, for every packet received at the destination interface, a Transit Time is calculated. Over some given period referred to as the "clock control interval", e.g. 1 second, the minimum Transit Time is determined. The minimum Transit Time is reset for each new time period. Immediately after the expiry of a time period, a clock control algorithm will read the minimum Transit Time recorded for that period, determine the correction required to the destination interface clock frequency, and write the required frequency to the DCO of the destination interface. The clock control interval will generally be relatively large compared to the (transmission and arrival) intervals between packets so that the minimum Transit Time that the algorithm reads will be the minimum of a large set of Transit Time values.

A suitable clock control algorithm is given by the following difference equation:

$$F_m = F_{m-1} + G1(Y_m - Y_{m-1}) + G2(Y_m - \text{TransitTarget}) \quad \text{Equation (2)}$$

Where:
$F_m$ is the Frequency to be written to the DCO of the destination interface;
G1, G2 are constants that determine the dynamic behaviour;
$F_{m-1}$ is the Current DCO Frequency;
$Y_m$ is the minimum Transit Time;
TransitTarget is the desired target time for the Transit Time; and
m is a sample number that increments each time the clock control algorithm reads the minimum Transit Time.

The constants G1 and G2 determine the frequency response of the system and are selected to track long term drift in $f_{service}$ but reject short-term variation due to packet delay variations.

A further term may optionally be added to Equation (2). This makes use of an Offset constant which can be used during operation to adjust the operating point (i.e. fill level) of the PDV buffer to a new value. This may be desirable in order to cope with changing network conditions which cause the buffer to empty (or overflow). A filter function, such as a first order filter, may be used to provide a filtered measurement of the PDV buffer fill level. The clock control algorithm can then be expanded to read the filtered level, and set the Offset accordingly.

This system is robust in the presence of lost packets because the Remote and Local Timestamps of the next packet received following any lost packet(s) are unaffected by the loss. The lost packets merely represent a short term loss of resolution in the measurement. In a typical system there will be thousands of packets per second so that even a packet loss rate which is at or close to the maximum (i.e. a few percent) will have a negligible effect on the result.

Figure 3:
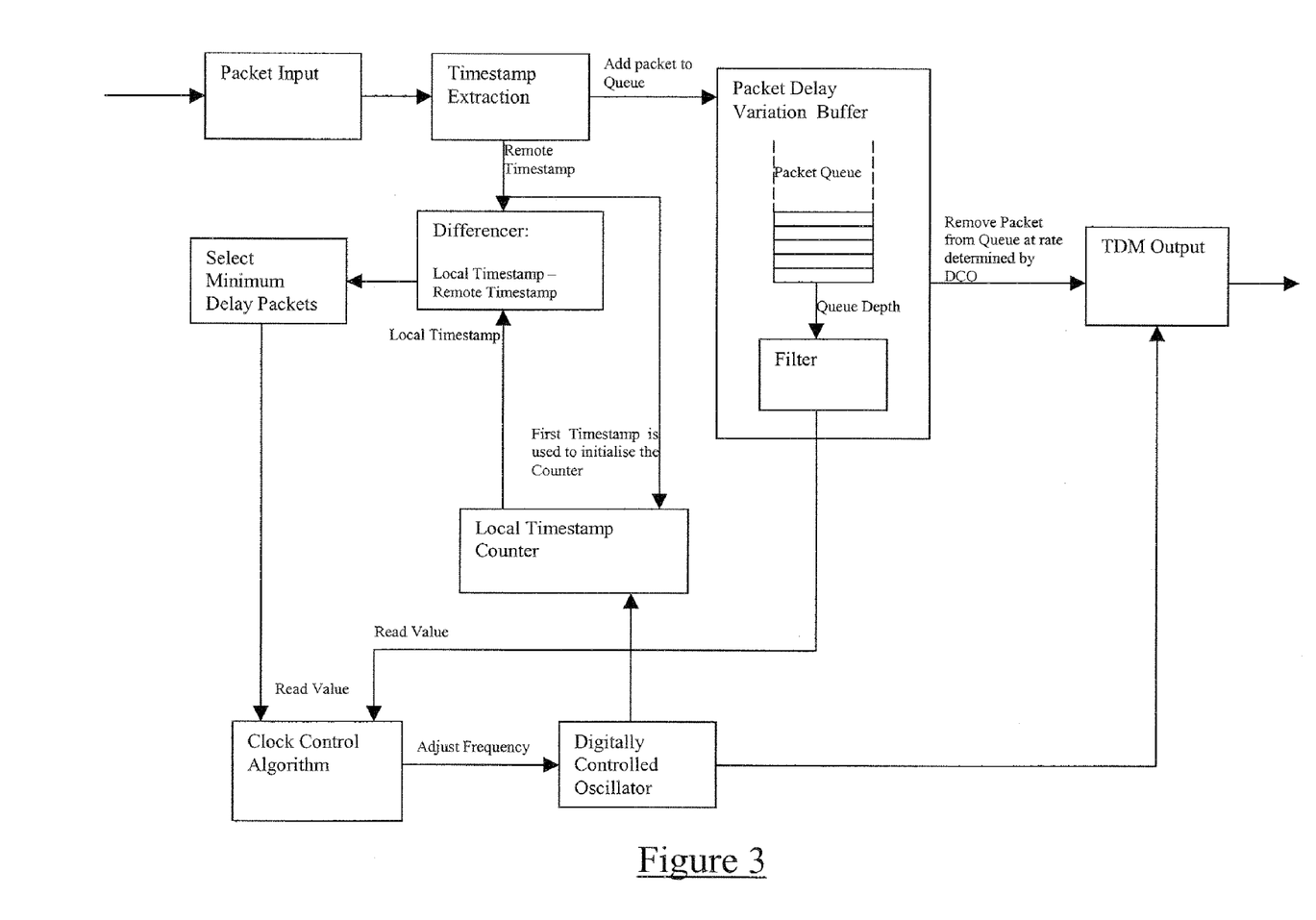
FIG. 3 illustrates an architecture for a destination interface coupling a packet network to a TDM link.

FIG. 3 illustrates schematically the clock recovery process described above incorporated into the destination interface architecture.

The clock recovery method described here provides a number of advantages over known methods. These include:

1. The method selects and uses only the timing information derived from packets subjected to the minimum delay through the packet network in order to reduce the noise on the recovered clock.
2. No special timing packets or information are required.
3. The use of only minimum delay Transit Time values (with the filtering out of other Transit Time values) allows the clock control algorithm to operate at a relatively slow rate as compared to the rate at which the Transit Time values are generated and processed. Thus, for example, a high speed filter performing minimum delay Transit Time determination could be implemented in hardware with the low speed clock control algorithm being implemented by an external CPU. This confers significant benefits, such as flexibility, reduction of development risk, ease of optimising the solution for a specific environment etc.
4. The method enables the Local Timestamp to be initialised to the value of the first received Remote Timestamp thus minimising wraparound problems and preventing a start up error with the recovered clock.

5. The method reduces the effect of low frequency variation, for example due to variation in network loading, on the stability of the recovered clock.

It will be appreciated by the person of skill in the art that various modifications may be made to the above described embodiments without departing from the scope of the present invention. Thus for example, the following modifications may be made to the proposed method:
1. The use of alternative algorithms for removing the effect of late packets from the clock recovery system.
2. The use of alternative clock control algorithms, e.g. $2^{nd}$ and higher order, fuzzy logic, neural networks, self-tuning algorithms that vary parameters such as the time constant or clock control interval over time.
3. The use of an internal or external CPU for the clock control and depth control algorithms.
4. The use of byte, frame or packet counts as the Timestamp instead of bits, e.g. each tick of the clock represents a byte, frame, or packet rather than a bit.
5. It would be possible to implement the method without timestamps where packets are of a consistent payload size, and where packets contain consecutive sequence numbers. In this case, the receiving interface generates the Remote Timestamp as well as determining the Local Timestamp based upon the output from the TDM transmitted at the packet network egress. Thus, for example, if every packet has a payload of 256 bits, then for each packet the Remote Timestamp can be calculated as: Remote Timestamp=256*sequence number.
6. Adjusting the time over which the minimum transit time is measured to reduce the effect that periods of high network loading have on the recovered clock.
7. Monitoring the sequence of minimum transit times and ignoring values above a defined threshold.
8. Monitoring the sequence of minimum transit times. If a step change in the sequence is detected, the recovered clock is set into holdover mode. When a new sequence of stable minimum values is detected adjustment of the recovered clock is resumed.

Over a given network it is possible to predict an expected minimum Transit Time range with a reasonable degree of accuracy. It is possible to use such a range to eliminate spurious calculated minimum Transit Times within sample intervals. However, care should be taken when a number of successive intervals give rise to minimum Transit Times which lie outside of this range. Such a sequence if consistent is likely to be indicative of a change in the network structure or packet route properties, requiring a step change in the frequency $f_{regen}$ and a redefinition of the expected minimum Transit Time range.

Figure 4:
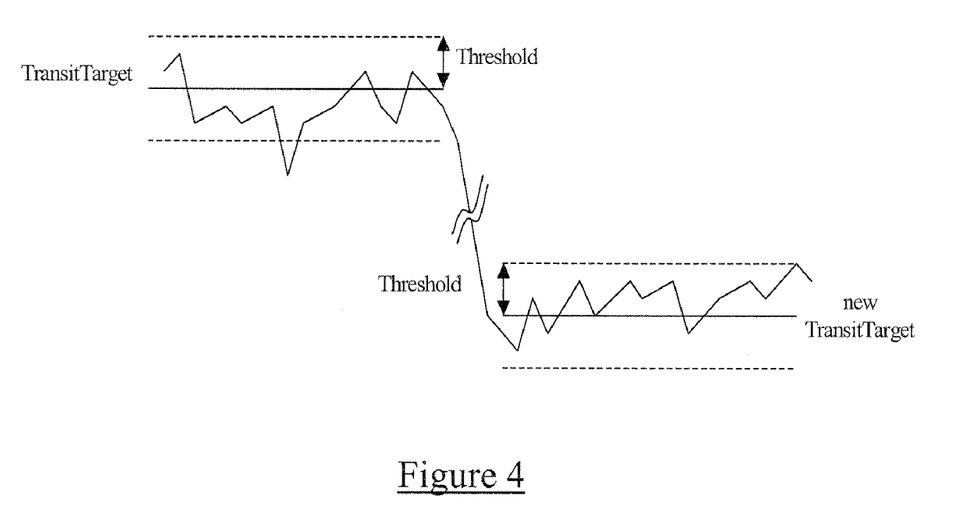
FIG. 4 illustrates Transit Time variations with time for packets sent over an asynchronous network.

FIG. 4 illustrates such a scenario, plotting minimum Transit Time against time and where a step change occurs in the minimum Transit Time. For the first few intervals, as the minimum Transit Time falls outside of the defined range, the frequency $f_{regen}$ is not adjusted (i.e. it is maintained in a "holdover" state). However, once it is determined that the minimum Transit Time is stable, the value TransitTarget in Equation (2) above is adjusted to the new minimum Transit Time. Phase locking then continues based around the new target point. This allows $f_{regen}$ to exit from the holdover state with minimal phase realignment.

In a congested network, the least delayed packets may occur very infrequently so rejection of the timing from other packets is of utmost importance to allow a clock to be recovered with sufficient accuracy to meet the stringent phase requirements for the synchronous TDM circuit that is being replaced.

Figure 5:
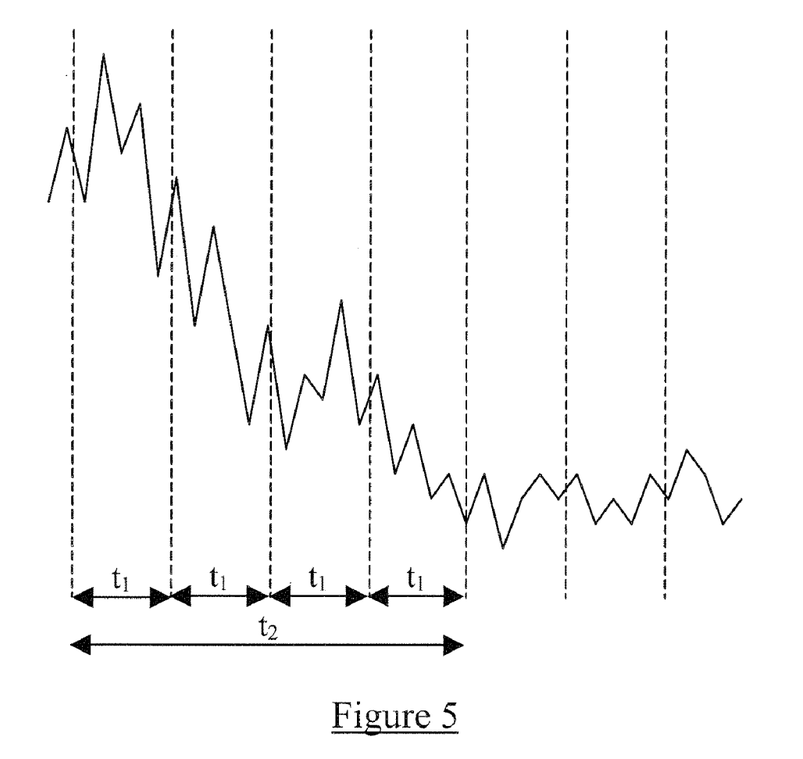
FIG. 5 illustrates Transit Time intervals used to validate minimum Transit Time values.

In a further refinement to the procedures described above, a minimum Transit Time for a given interval (say of duration $t_1$) is validated against the minimum transit times determined in each of a sequence of previous intervals (also of duration $t_1$), as well as against the minimum Transit Time in a larger interval $t_2$ including each of those previous intervals and the present interval. This is illustrated in FIG. 5. Ideally, the minimum Transit Time from the most recent interval $t_1$ is selected, since this reduces lag in the control loop and provides greater stability for a given loop filter, or allows a faster response loop filter to be employed. However, if this value is not consistent with the minima in the previous sequence of $t_1$ intervals, and or with the minimum from the interval $t_2$, an alternative minimum is used or the current minimum discarded.

Figure 6:
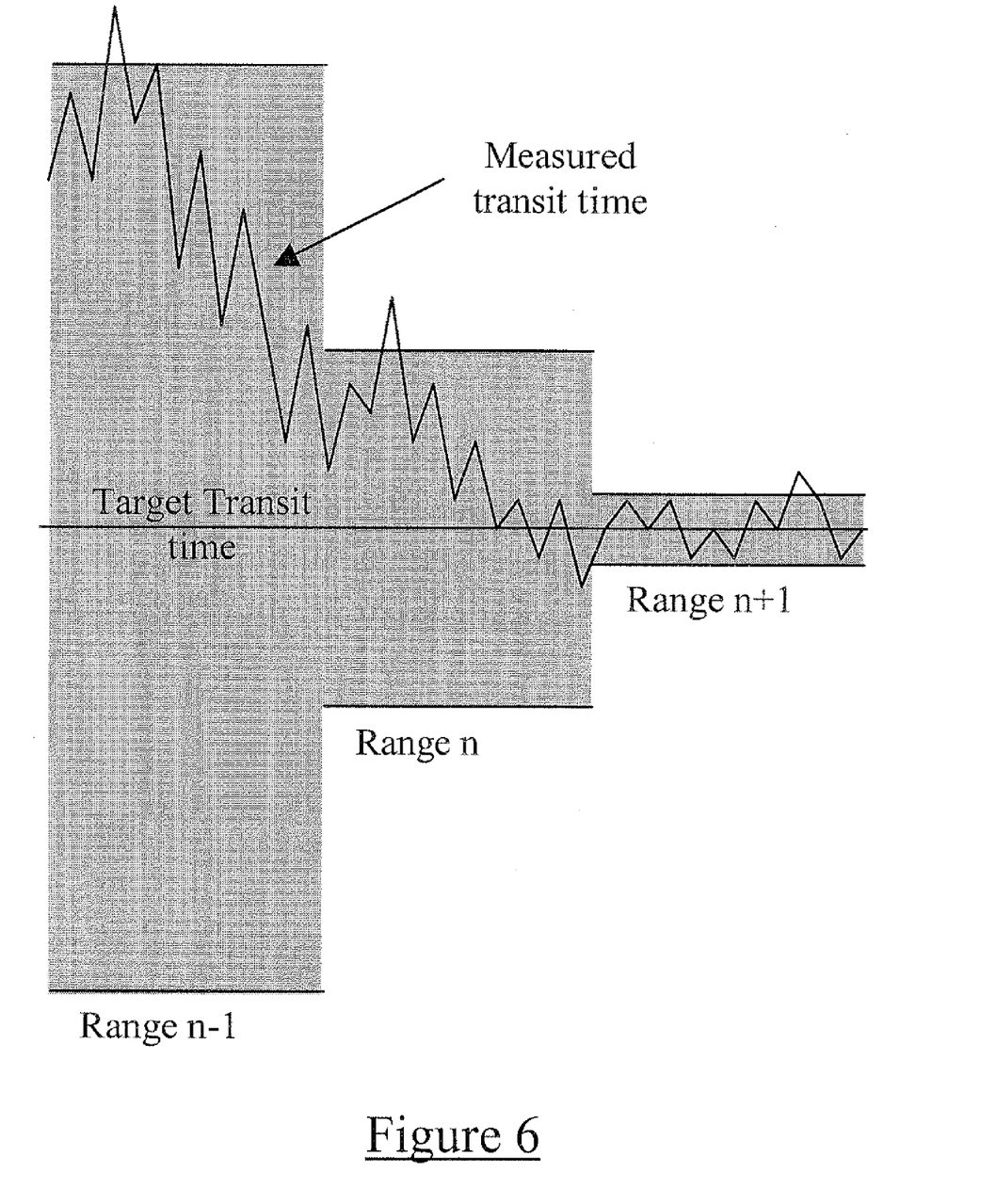
FIG. 6 illustrates a reduction in minimum Transit Time threshold range as phase lock is approached.

As the clocks approach phase lock, the threshold used to validate the Transit Time is reduced, so as to provide more precise information for use in the control of the clock $f_{regen}$. This is illustrated in FIG. 6. The threshold may also be increased if phase locking starts to fail. Hysteresis is used to avoid problems when changing ranges. It would also be possible to perform the validation criteria using a continuous scheme rather than using explicit ranges. The range currently being used also controls how the Transit Time is handled if it falls outside of the range.

The procedures described above will allow the frequency and phase of the local clock to synchronise to the remote clock assuming that the offset between the clocks is relatively small. Whilst this will be true for the steady state situation, it will not be true upon initialisation or resetting of a system. It is therefore proposed that in place of the synchronisation process described above a "quick" frequency synchronisation process be used at initialisation or reset in order to achieve approximate synchronisation. Once this is achieved, a switch is made from the quick process to the process described above.

The quick synchronisation process relies upon the following equation:

$$PPM(n) = \frac{TransitTime(n) - TransitTime(m)}{RxTime(n) - RxTime(m)} \times \frac{1{,}000{,}000}{fnominal} \quad (3)$$

Where:
PPM is the adjustment to be made to the regeneration frequency $f_{regen}$ in parts per million
TransitTime(n) is the least delayed packet from interval n
TransitTime(m) is the least delayed packet from interval m
RxTime(n) is the reception time for least delayed packet n
RxTime(m) is the reception time for least delayed packet m
$f_{nominal}$ is the frequency of the clock used to generate the timestamp for the TransitTime.

Figure 7:
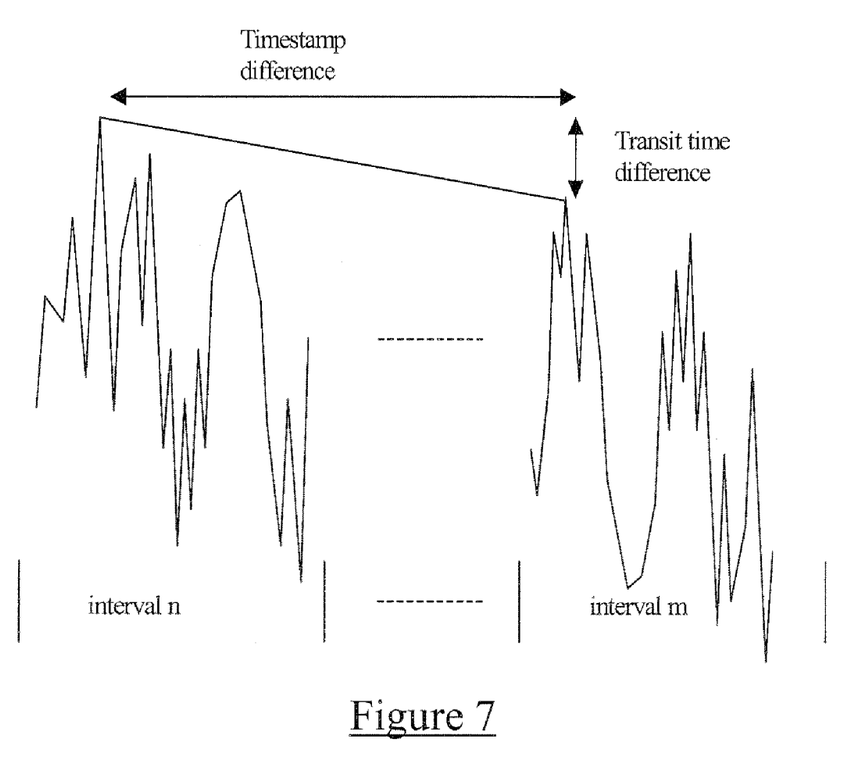
FIG. 7 illustrates minimum Transit Time variations over time including a step change.

FIG. 7 illustrates the variation in packet Transit Time with time. The definition of Transit Time used here is:

Transit Time(*n*)=Remote Timestamp(*n*)−Local Timestamp(*n*)

such that the least delayed packets will have a greater Transit Time than the most delayed packets.

At initialisation or reset, $f_{regen}$ is set to some predefined frequency. Over the first interval n, the minimum Transit Time is determined. After some further period has elapsed, e.g. 1 minute, the minimum Transit Time over interval m is determined. These values, together with the times of occurrence of the respective minimum Transit Times are used in equation (3) to determine the frequency offset in PPM. The frequency of the destination clock, $f_{regen}$, is incremented or decremented accordingly.

It will be appreciated that if the offset frequency is large, applying equation (3) to directly calculate the frequency offset may not immediately result in an accurate estimate of the true offset. An improved offset may be obtained by compensating the Transit Time estimates (in intervals n and m) using the initial offset estimate. New minimum Transit Times in these intervals are then determined and used to compute an improved frequency offset. This process may be repeated to improve the estimate still further.

The quick synchronisation procedure described above may be used independently of the phase and frequency synchronisation procedure based upon equation (2), in systems where only frequency locking is required.

The invention claimed is:

1. A method of synchronizing first and second clocks coupled respectively to an ingress interface and an egress interface of a packet network, where the first clock determines the bit rate of a constant bit rate stream arriving at the ingress interface and the second clock rate is synchronized with the first clock and determines the bit rate of a constant bit rate stream sent from the egress interface, the method comprising:
calculating a minimum packet Transit Time over the network in each of successive time intervals using local and remote timestamps generated at the egress and ingress interfaces, respectively, or both being generated at the egress interface, from first and second clock frequencies or at multiples or sub-multiples thereof, and
adjusting the frequency of the second clock so that the calculated minimum packet transit times converge to a predetermined target minimum packet Transit Time so as to achieve both phase and frequency synchronisation of the first and second clocks.

2. A method according to claim 1, wherein the frequency of the second clock is adjusted by adding to the current second clock frequency a first adjustment comprising a product of a first scaling factor and a difference between each calculated minimum packet Transit Time and the target minimum packet Transit Time.

3. A method according to claim 2 and comprising calculating a packet Transit Time for each packet received at said egress, and identifying the minimum packet Transit Time within each time interval.

4. A method according to claim 1, the method comprising:
receiving a synchronous data stream at said ingress to the packet network at a frequency determined by said first clock, packetising data to form packets, and sending the packets over the packet network;
receiving the packets at said egress from the packet network;
for each received said packet, determining the Remote Timestamp being indicative of the state of said first clock when the packet was sent, determining the Local Timestamp for the packet, and calculating a difference between said Remote and Local Timestamps to provide a Transit Time for the packet;
determining the minimum Transit Time for packets in successive time intervals; and
adjusting the frequency of said second clock so that the minimum packet Transit Times converge to the predetermined target minimum packet Transit Time.

5. A method according to claim 4 and comprising incorporating respective Remote Timestamps into packets at said ingress to the packet network, said step of determining the Remote Timestamp for a packet at the egress comprising extracting the Remote Timestamp from the packet.

6. A method according to claim 4, wherein said step of determining the Remote Timestamp for each packet comprises computing the Remote Timestamp at the egress from the packet network.

7. A method according to claim 6, wherein said step of determining the Remote Timestamp for each packet comprises maintaining a data counter at said egress, wherein the data counter records the data volume contained in the payloads of received packets, and using the value contained in said counter when said packet is received, as the Remote Timestamp for that packet.

8. A method according to claim 6, wherein said step of determining the Remote Timestamp for each packet comprises computing the Remote Timestamp using the packet payload size and packet sequence number.

9. A method according to claim 4, wherein said Local and Remote Timestamps are counts representing numbers of bits, fractional bits, multiples of bits, frames of synchronous data streams, or representing packet payload size.

10. A method according to claim 4, wherein the frequency of the second clock is additionally adjusted using the difference between a most recently determined minimum Transit Time and a previously determined minimum Transit Time.

11. A method according to claim 10, wherein the frequency of the second clock is adjusted by adding to the current second clock frequency a second adjustment comprising a product of a second scaling factor and the difference between the most recently determined minimum Transit Time and the previously determined minimum Transit Time.

12. A method according to claim 1 and comprising adjusting the frequency of the second clock in dependence upon the fill level of a buffer of the egress and into which incoming packets are placed.

13. A method according to claim 12, wherein the fill level is filtered to remove short term fluctuations, and an offset value is derived from the filtered fill level.

14. A method according to claim 1, wherein the frequency of the second clock is varied according to the formula:

$$F_m = F_{m-1} + G1(Y_m - Y_{m-1}) + G2(Y_m - \text{TransitTarget})$$

Where:
$F_m$ is the frequency of said second clock
$G1$ is a proportional term for the loop gain
$G2$ is an integral term for the loop gain
$F_{m-1}$ is the current frequency of the second clock
$Y_m$ is the minimum Transit Time for the current time interval
$Y_{m-1}$ is the minimum Transit Time for the previous time interval, and
TransitTarget is the predetermined target minimum Transit Time.

15. A method according to claim 1 and comprising, at initialisation of a system comprising said first and second clocks, adjusting the frequency of the second clock in dependence upon the change in the minimum packet Transit Time over the network, measured in each of two time intervals separated by a given time interval, and subsequently carrying out the defined steps to achieve both phase and frequency synchronisation of the first and second clocks.

16. A method according to claim 15 and comprising adjusting the frequency of the second clock at said initialisation in dependence upon the ratio of said change in the minimum packet Transit Time and the time interval separating the times of arrival of packets subject to the minimum packet Transit Time.

17. A method according to claim 15 and comprising repeating the step of adjusting the frequency, during said initialisation, one or more times until a substantially stable frequency is achieved for the second clock.

18. A method according to claim 1 and comprising:
defining a threshold range for the minimum packet Transit Time; and
disregarding minimum packet Transit Times which fall outside of said range and not adjusting the frequency of the second clock in dependence upon these disregarded Transit Times.

19. A method according to claim 15 and comprising:
defining a threshold range for the minimum packet Transit Time;
disregarding minimum packet Transit Times which fall outside of said range and not adjusting the frequency of the second clock in dependence upon these disregarded Transit Times, except where the calculated minimum packet Transit Times have fallen outside of said threshold range for some defined time period.

20. A method according to claim 19, wherein the frequency of the second clock is only varied after the minimum packet Transit Time has stabilised.

21. A method according to claim 20, comprising setting a value of the predetermined target minimum packet Transit Time to the stabalised minimum packet Transit Time.

22. A method according to claim 1, wherein the ingress to the packet network is coupled to a first time division multiplexed (TDM) link, the TDM link operating at said first clock frequency, with the egress from the packet network being coupled to a second TDM link operating at said second clock frequency.

23. An apparatus for synchronizing first and second clocks coupled respectively to ingress and egress interfaces over a packet network, the apparatus comprising:
means for calculating a minimum packet Transit Time in each of successive time intervals using local and remote timestamps generated at the egress in ingress interfaces, respectively, or both being generated at the egress interface, from first and second clock frequencies or at multiples or sub-multiples thereof, wherein the second clock is synchronized to the first clock; and
means for adjusting the frequency of the second clock so that the calculated minimum packet Transit Times converge to a predetermined target minimum packet Transit Time so as to achieve both phase lock and frequency synchronization of the first and second clocks.

24. Apparatus according to claim 23 and comprising:
first processing means for determining for each packet received at an egress of the packet network a Remote Timestamp being indicative of the state of said first clock when each said packet was sent;
second processing means for determining a Local Timestamp for the packet;
difference means for calculating the difference between said remote and local timestamps to provide a Transit Time for the packet; and
third processing means for determining the minimum Transit Time experienced by packets in successive time intervals.

25. A method according to claim 16, the step of adjusting the frequency comprising determining a correction factor using the equation:

$$PPM(n) = \frac{TransitTime(n) - TransitTime(m)}{RxTime(n) - RxTime(m)} \times \frac{1,000,000}{f nominal}$$

where :
PPM is the adjustment to be made to a regeneration frequency $f_{regen}$ in parts per million
TransitTime(n) is a transit time for the least delayed packet from interval n
TransitTime(m) is a transit time for the least delayed packet from interval m
RxTime(n) is the reception time for the least delayed packet from the interval n
RxTime(m) is the reception time for the least delayed packet from the interval m
$f_{nominal}$ is the frequency of the clock used to generate the timestamp for the Transit Time.

26. A method according to claim 25, wherein the correction factor is applied to compensate the Transit Time estimates (in intervals n and m), and new minimum Transit Times in these intervals are determined and used to compute an improved frequency correction factor.

* * * * *